United States Patent [19]

Weber

[11] Patent Number: 4,633,621
[45] Date of Patent: Jan. 6, 1987

[54] PORTABLE CUTOFF AND END-BEVELING DEVICE

[76] Inventor: Raymond R. Weber, 17710 Larch Way, Alderwood Manor, Wash. 98037

[21] Appl. No.: 796,043

[22] Filed: Nov. 7, 1985

[51] Int. Cl.⁴ .......................... B24B 25/00; B25F 3/00
[52] U.S. Cl. ............................ 51/181 R; 51/170 PT;
                                          30/123; 408/207; 83/469
[58] Field of Search .......... 51/170 R, 170 PT, 181 R;
        30/123, 388; 7/158; 408/199, 207, 211, 227,
        228, 20, 21, 28; 29/81 F, 81 J; 82/4 C; 83/469

[56] References Cited

U.S. PATENT DOCUMENTS

| 963,610 | 7/1910 | Mathews | 408/28 |
| 1,884,460 | 10/1932 | Williams . | |
| 2,524,323 | 10/1950 | Lloyd-Young | 51/181 R |
| 3,583,106 | 6/1971 | Dobbertin | 51/170 PT |
| 3,754,832 | 8/1973 | Stickler | 408/227 |
| 3,893,240 | 7/1975 | Morner et al. | 30/390 |
| 4,060,940 | 12/1977 | DeWitt | 51/170 PT |
| 4,205,493 | 6/1980 | Kim | 51/170 T |

Primary Examiner—Roscoe V. Parker
Attorney, Agent, or Firm—Ward Brown; Robert W. Beach

[57] ABSTRACT

A ring having a frustoconical inner periphery for beveling the end of a conduit is mounted on an upright side surface of the circular saw blade of a portable cutoff saw concentric with the axis of rotation of the blade.

12 Claims, 6 Drawing Figures

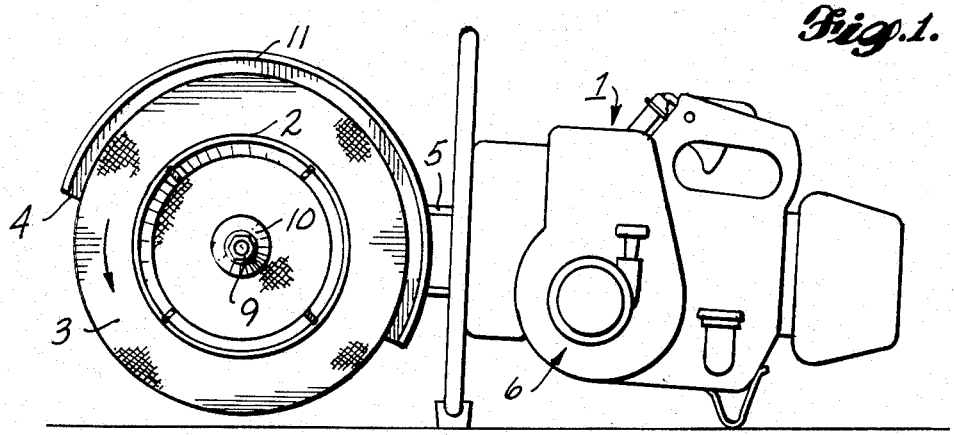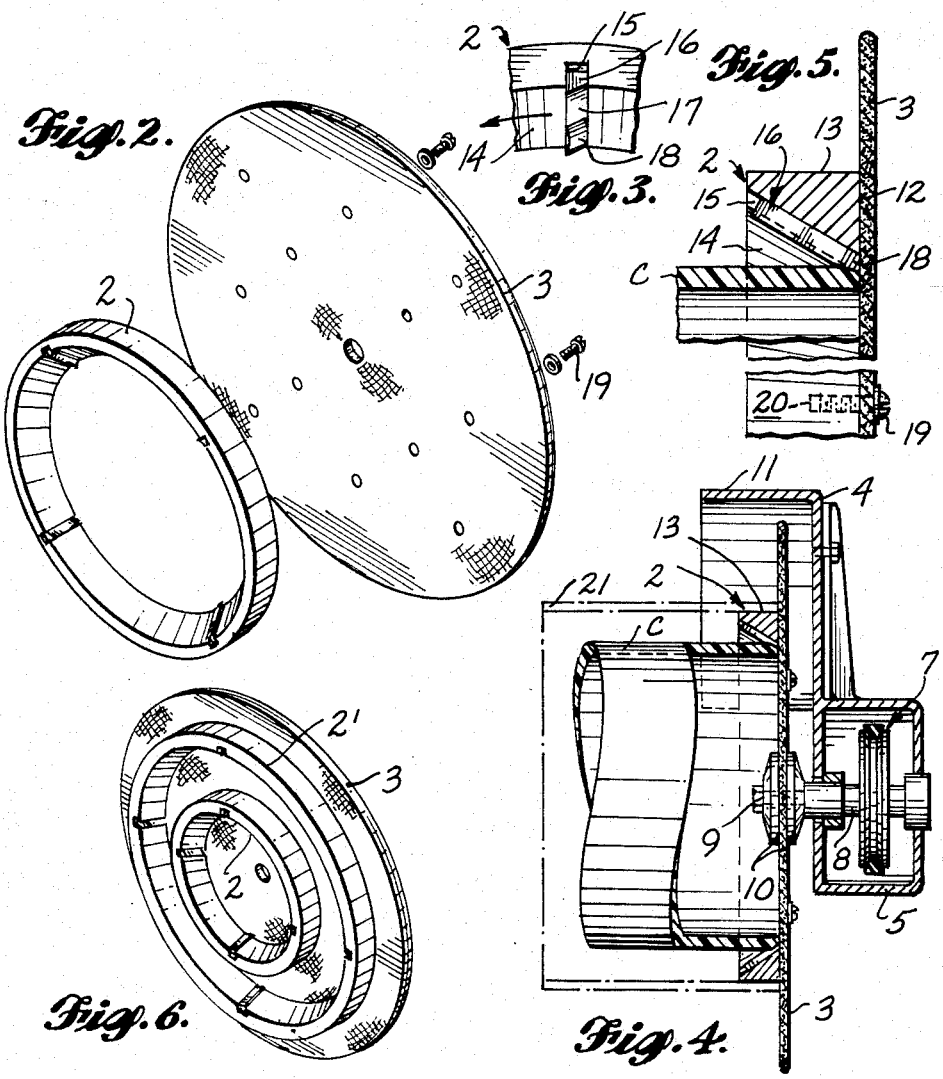

PORTABLE CUTOFF AND END-BEVELING DEVICE

BACKGROUND OF THE INVENTION

1. Field of the Invention

The present invention relates to a device for cutting a conduit to a desired length and for deburring and beveling the cut end so as to ease its insertion into the bell of an adjoining conduit or a socket of a fitting.

2. Prior Art

U.S. Pat. No. 3,583,106, issued June 8, 1971, U.S. Pat. No. 3,893,240, issued July 8, 1975, and U.S. Pat. No. 4,060,940, issued Dec. 6, 1977, disclose representative known portable cutoff saws which include small internal-combustion engines or an electric motor driving a circular blade. Such saws are often used to cut a conduit, such as a drain, sewer or water pipe, to a desired length. The cut end portion of the conduit may be inserted into the enlarged bell of an adjoining conduit or a socket of a fitting such as an elbow or a tee. The cut pipe end will have a sharp, sometimes burred outer edge which can make insertion difficult and can affect the overall seal of the resulting joint, such as if the sharp cut end damages or displaces a resilient sealing ring or gasket in the bell of the adjoining conduit or fitting.

U.S. Pat. No. 3,754,832, issued Aug. 28, 1973, discloses a device of generally frustoconical shape turned manually to deburr the inner and outer peripheral edges of the cut end of a small diameter plastic conduit without beveling the cut end.

Williams U.S. Pat. No. 1,884,460, issued Oct. 25, 1932, discloses a tool having a frustoconical cutterhead turned manually for refacing valves or valve seats.

U.S. Pat. No. 4,205,493, issued June 3, 1980, discloses a "Portable Chamfering Grinding Device" in which an abrasive, frustoconical grinding head is rotated by a small, high-speed, pneumatic motor for chamfering the cut end of a steel tube.

SUMMARY OF THE INVENTION

The principal object of the present invention is to provide a novel modified device that can be incorporated in a conventional portable cutoff saw to adapt the saw for use in cutting a conduit and for beveling the outer periphery of the cut end without requiring a separate tool to be purchased, hauled and stowed by the user, but of simple construction and inexpensive manufacture and effective for both cutting and beveling over a long period of use.

In the preferred embodiment of the present invention, the foregoing object is accomplished by providing a modified circular blade for an otherwise conventional portable cutoff saw, such blade having an annular beveling component mounted on an exposed side face of the blade, concentric with the axis of rotation of the blade, the inner periphery of such ring tapering frustoconically inward and having cutting elements effective to bevel the cut end of a length of conduit.

BRIEF DESCRIPTION OF THE DRAWINGS

FIG. 1 is a somewhat diagrammatic side elevation of a portable cutoff and end-beveling device in accordance with the present invention, including a combination circular blade and end-beveling ring.

FIG. 2 is an exploded top perspective of the blade and ring of the device of FIG. 1.

FIG. 3 is a fragmentary, enlarged, side elevation of the ring of FIGS. 1 and 2.

FIG. 4 is a fragmentary end elevation of the device of FIG. 1, with parts broken away, illustrating use of the device for beveling the cut end of a conduit.

FIG. 5 is a fragmentary, enlarged, detail, end elevation of the device of FIG. 1, with parts broken away.

FIG. 6 is a top perspective of a modified blade and beveling ring combination.

DETAILED DESCRIPTION

As shown in FIG. 1, in the preferred embodiment the cutoff and end-beveling device in accordance with the present invention utilizes a portable cutoff saw 1 of essentially conventional construction except for the beveling component 2 mounted on the circular blade 3 and, possibly, the blade guard 4 carried by the cantilever extension arm 5 of the saw frame. The saw includes a small engine or motor 6 for rotating the blade, such as by a V-belt and pulley assembly 7 mounted on the extension arm 5 as seen in FIG. 4. The circular blade 3 is clamped to the rotating driven shaft 8 by a central mounting bolt 9 and embracing washers 10. The stationary blade guard 4 mounted on the extension arm 5 extends along one upright flat surface of the blade and has an upper cylindrical segment 11 extending outward so as to encircle all but the exposed, working, generally bottom peripheral edge portion of the blade. The upright side of the blade opposite the extension arm 5 is exposed.

In accordance with the present invention, the annular beveling component or ring 2 is mounted on the exposed upright surface of the blade 3, concentric with the axis of rotation of the blade but separate from the mounting of the blade on the driven shaft 8. As best seen in FIG. 5, ring 2 is preferably of solid, substantially right-triangular cross section including the planar base surface 12 butted against the exposed face of the blade, the outer cylindrical surface 13 projecting perpendicularly from the blade and the inner substantially frustoconical surface 14 flared outward in diameter from the exposed blade surface substantially to the outer cylindrical surface 13.

The frustoconical inner periphery 14 of the beveling ring 2 has linear grooves 15 preferably positioned equiangularly about the circumference of the beveling ring and each snugly receiving a narrow cutter 16. In the preferred embodiment, four such grooves and blades are provided so that the angle between adjacent grooves and blades is 90 degrees. With reference to the direction of blade rotation, the leading side of each cutter projects inward beyond the ring inner surface 14 a short distance and the inner edge 17 which joins the leading and trailing cutter sides is angled rearward and outward so as to meet such surface 14 at the edge of its groove 15 as seen in FIG. 3. A concave depression or cove 18 is formed at the base of the inner cutter edge 17 adjacent to the exposed face of the saw blade.

The beveling ring 2 can be firmly secured on the exposed surface of the blade by screws 19 extending through apertures in the blade and threaded into blind bores 20 in the beveling ring as best seen in FIG. 5. Preferably such bores are spaced equidistantly between the cutter mounting grooves 15, which requires that there be the same number of mounting screws as cutters.

With reference to FIGS. 4 and 5, a conduit C can be cut to a desired length by the rotating saw blade 3 conventionally, it being understood that the blade 3 projects outward beyond the beveling ring 2 a distance at least several times the wall thickness of the conduit. The outer cylindrical surface 13 of the beveling ring can act as a guide by which the depth of cutting insertion of the saw blade through the conduit wall can be gauged as the conduit is rotated to complete a circumferential cutting of the conduit. After the conduit is cut to the desired length, the sharp cut end of the conduit and the rotating saw blade can be moved together generally coaxially. The smaller base diameter of the substantially frustoconical surface of rotation defined by the rotating inner edges of the cutters is less than the outside diameter of the conduit so that the cutters cut or grind away and bevel the outer margin of the conduit cut end.

As best seen in FIG. 4, preferably the concave depressions 18 of the cutters extend inward generally parallel to the axis of rotation of the blade and are gradually curved through an arc of about 45 degrees to the exposed blade surface. Consequently, the freshly beveled outer periphery of the conduit cut end is rounded for easy insertion of such end portion into the enlarged end of an adjacent pipe or fitting.

In addition, as also shown in FIG. 5, preferably the rounded beveling of the outer periphery of the conduit cut end is limited by engagement of the inner margin of such end against the exposed side of the saw blade. For example, in the preferred embodiment the distance between cutters at the opposite sides of the beveling ring immediately adjacent to the exposed surface of the blade would be approximately equal to the average of the inside and outside diameters of the conduit C.

As shown in broken lines in FIG. 4, a generally cylindrical guard 2 having an inside diameter approximately equal to the outside diameter of the beveling ring 2 can have one end portion telescoped over and secured to the outer periphery of the ring to protect against chips or burrs flung outward during the beveling operation from contacting the user. Such a guard would preferably be of a length at least approximately equal to the diameter of the beveling ring and would be particularly desirable when beveling metal water pipe which can be somewhat brittle. The guard also guides the inward relative coaxial movement of the conduit end and the saw.

The beveling ring can be formed of strong metal material with the cutters being stainless steel. The cutoff and end-beveling device of the present invention can be sized for cutting and beveling a 4-inch, 6-inch or 8-inch (10.16-cm, 15.24-cm or 20.32-cm) PVC conduit commonly used for sewer pipes and drainpipes or for standard size metal pipes such as those commonly used for water supply lines.

More than one beveling ring can be mounted on the saw blade such as illustrated in FIG. 6 in which the inner beveling ring 2 is sized for 6-inch (15.24-cm) conduit and an outer beveling ring 2' is sized for 8-inch (20.32-cm) conduit, such rings being mounted on a conventional saw blade about 12 inches (30.48 cm) in diameter.

I claim:

1. A combination cutoff and beveling device for a conduit comprising a saw blade adapted for rotation about an axis, and a beveling ring of a diameter substantially less than the diameter of said blade, mounted on a side surface of said blade concentric with said axis and having an inner conduit-beveling periphery flared outward in diameter from said side surface of said blade.

2. The device defined in claim 1, in which the inner periphery of the beveling ring includes a plurality of separate inward-projecting cutters having sharpened inner edge portions for beveling the conduit.

3. The device defined in claim 1, including means for rotating the saw blade, means for mounting the blade on the rotating means, the beveling ring being mounted on the side surface of the blade separate from the mounting of the blade to the rotating means.

4. The device defined in claim 1, in which the beveling ring is of generally triangular cross section.

5. The device defined in claim 1, in which the beveling ring is of generally right-triangular cross section including a planar base surface abutted against the side surface of the blade, an outer cylindrical surface extending outward from the side surface of the blade perpendicular to the base surface and an inner generally frustoconical surface decreasing in diameter from generally the outer margin of said outer cylindrical surface to said base surface.

6. The device defined in claim 5, including a plurality of separate cutters projecting inward from the generally frustoconical surface of the blade.

7. The device defined in claim 6, the cutters including concave coves adjacent to the side surface of the blade.

8. The device defined in claim 1, in which the beveling ring, immediately adjacent to the side surface of the blade, has an inner diameter between the outside diameter of the conduit and the inside diameter of the conduit.

9. The device defined in claim 1, including a second beveling ring of a diameter substantially less than the diameter of the first beveling ring, mounted on the side surface of the blade and having an inner conduit-beveling periphery flared outward in diameter from the side surface of the blade.

10. The device defined in claim 1, including a tubular guard mounted on the beveling ring and projecting outward from the side surface of the blade beyond the beveling ring.

11. Mechanism for cutting a conduit to a desired length and for beveling the cut end portion of the conduit, comprising a portable hand-held and hand-supported cutoff saw including a circular blade having a central aperture, rotary power means for rotating said blade and mounting means extending through said central aperture of said blade for coupling said blade to said rotary power means, a beveling ring mounted on said blade concentric with the center of said blade, said beveling ring having an outer diameter substantially greater than the outer diameter of the conduit and including an inner conduit-beveling surface flared outward in diameter from said side surface of said blade, the diameter of the inner conduit-beveling surface of said beveling ring adjacent to said side surface of said blade being less than the outer diameter of the conduit.

12. The mechanism defined in claim 11, in which the diameter of the inner conduit-beveling surface of the beveling ring adjacent to the blade is less than the inside diameter of the conduit.

* * * * *